United States Patent
Ahn et al.

(10) Patent No.: US 9,377,910 B2
(45) Date of Patent: Jun. 28, 2016

(54) TOUCH SENSING APPARATUS AND TOUCH SENSING METHOD USING THE SAME

(71) Applicants: Samsung Display Co., Ltd., Yongin, Gyeonggi-do (KR); Ulsan National Institute of Science and Technology (UNIST), Ulja-gun, Ulsan (KR)

(72) Inventors: Soon-Sung Ahn, Yongin (KR); Franklin Bien, Ulsan (KR); Jae-Joon Kim, Ulsan (KR); Sang-Hyune Heo, Ulsan (KR); Kyeong-Hwan Park, Ulsan (KR)

(73) Assignees: Samsung Display Co., Ltd., Yongin-si (KR); Ulsan National Institute of Science and Technology, Ulsan (KR)

( * ) Notice: Subject to any disclaimer, the term of this patent is extended or adjusted under 35 U.S.C. 154(b) by 262 days.

(21) Appl. No.: 14/027,053

(22) Filed: Sep. 13, 2013

(65) Prior Publication Data

US 2014/0313157 A1    Oct. 23, 2014

(30) Foreign Application Priority Data

Apr. 22, 2013    (KR) ........................ 10-2013-0044233

(51) Int. Cl.
    *G06F 3/045*      (2006.01)
    *G06F 3/044*      (2006.01)

(52) U.S. Cl.
    CPC ....................................... *G06F 3/044* (2013.01)

(58) Field of Classification Search
None
See application file for complete search history.

(56) References Cited

U.S. PATENT DOCUMENTS

| 5,861,583 | A | 1/1999 | Schediwy et al. |
|---|---|---|---|
| 2002/0050893 | A1 | 5/2002 | Buck |
| 2007/0109274 | A1* | 5/2007 | Reynolds ..................... 345/173 |
| 2011/0042152 | A1 | 2/2011 | Wu |
| 2011/0210941 | A1* | 9/2011 | Reynolds et al. ............ 345/174 |
| 2012/0056841 | A1 | 3/2012 | Krenik et al. |
| 2012/0169660 | A1 | 7/2012 | Seo |
| 2012/0268142 | A1 | 10/2012 | Kremin et al. |

FOREIGN PATENT DOCUMENTS

| KR | 10-2010-0005854 | 1/2010 |
|---|---|---|
| KR | 10-1056627 B1 | 8/2011 |
| KR | 10-2012-0078072 | 7/2012 |

* cited by examiner

*Primary Examiner* — Adam R Giesy
*Assistant Examiner* — Henok Heyi
(74) *Attorney, Agent, or Firm* — Lewis Roca Rothgerber Christie LLP

(57) ABSTRACT

A touch sensing apparatus includes a touch screen panel including first electrodes along a first direction and second electrodes along a second direction crossing the first direction to form capacitances with the first electrodes, a driving circuit configured to supply a driving signal to the first electrodes; and a sensing circuit configured to detect output sensing signals from the second electrodes and recognize a touch input based on the output sensing signals. The sensing circuit includes a switching unit configured to modulate the output sensing signals by providing codes as respective input sensing signals to the second electrodes, an amplifying unit configured to amplify the modulated sensing signals, an analog-digital conversion unit configured to convert the amplified sensing signals into digital sensing signals, and a controller configured to demodulate the digital sensing signals and detect a touch input and its position from the demodulated sensing signals.

14 Claims, 4 Drawing Sheets

TOUCH SENSING APPARATUS AND TOUCH SENSING METHOD USING THE SAME

CROSS-REFERENCE TO RELATED APPLICATION

This application claims priority to and the benefit of Korean Patent Application No. 10-2013-0044233, filed on Apr. 22, 2013 in the Korean Intellectual Property Office, the entire content of which is incorporated herein by reference.

BACKGROUND

1. Field

Aspects of embodiments of the present invention relate to a touch sensing apparatus and a touch sensing method using the touch sensing apparatus.

2. Description of the Related Art

Recently, touch sensing apparatuses have come into widespread use. A touch sensing apparatus inputs a user's instruction by selecting an instruction content displayed on a screen of a display device corresponding to a touch input from a user's hand or an object such as a stylus pen. Implementations of touch sensing apparatuses include resistive overlay touch sensing apparatuses, capacitive touch sensing apparatuses, photosensitive touch sensing apparatuses, etc. Capacitive touch sensing apparatuses have relatively excellent durability and few errors in touch recognition, and can recognize multi-touches. Thus, the application field of the capacitive touch sensing apparatus has been gradually extended.

SUMMARY

Embodiments of the present invention provide for a touch sensing apparatus and a touch sensing method using the touch sensing apparatus, which can improve power consumption while reducing noise.

In an embodiment of the present invention, a touch sensing apparatus is provided. The touch sensing apparatus includes a touch screen panel including first electrodes along a first direction and second electrodes along a second direction crossing the first direction to form capacitances with the first electrodes, a driving circuit configured to supply a driving signal to the first electrodes, and a sensing circuit configured to detect output sensing signals from the second electrodes and recognize a touch input based on the output sensing signals. The sensing circuit includes a switching unit configured to modulate the output sensing signals by providing codes as respective input sensing signals to the second electrodes, an amplifying unit configured to amplify the modulated sensing signals, an analog-digital conversion unit configured to convert the amplified sensing signals into digital sensing signals, and a controller configured to demodulate the digital sensing signals and detect a touch input and its position from the demodulated sensing signals.

The switching unit may be further configured to divide the second electrodes into one or more groups each including two or more of the second electrodes, modulate the output sensing signals by respectively providing orthogonal codes as the input sensing signals to the second electrodes included in each of the groups, and then concurrently supply the modulated sensing signals included in a same one of the groups to an amplifier provided in the amplifying unit.

The controller may be further configured to separate the output sensing signals and detect the touch input by demodulating the modulated sensing signals for each group using the orthogonal codes provided as the respective input sensing signals.

The amplifying unit may include a corresponding one or more amplifiers respectively assigned to the groups.

The switching unit may be further configured to divide the second electrodes into one or more groups each including $2^n$ (n is a natural number) of the second electrodes, and respectively provide $2^n$ $2^n$-bit separable orthogonal codes as the input sensing signals to the second electrodes included in one group.

The switching unit may include first switches respectively coupled between the second electrodes and code voltage sources, and second switches respectively coupled between the second electrodes and the amplifying unit.

The first switches and the second switches may be configured to alternately turn on. The switching unit may be further configured to supply code voltages as the respective input sensing signals to the respective second electrodes using the first switches, and then couple the respective second electrodes to the amplifying unit using the second switches.

The driving circuit may be further configured to supply, to the first electrodes, a driving signal that swings between first and second voltages. The switching unit may be further configured to supply, to the respective second electrodes, code voltages corresponding to the codes when the first voltage is supplied to the first electrodes, and couple the second electrodes to the amplifying unit when the second voltage is supplied to the first electrodes.

The switching unit may be further configured to add the output sensing signals from ones of the second electrodes to which separable ones of the codes are respectively provided, and supply the added sensing signals to the amplifying unit. The amplifying unit may include a number of amplifiers corresponding to a number of groups each including ones of the second electrodes from which corresponding said output sensing signals are added.

The amplifying unit may further include third switches coupled in parallel with respective said amplifiers and configured to turn on when the codes are provided as the respective input sensing signals, and to turn off when the modulated sensing signals are supplied to the amplifying unit.

The touch sensing apparatus may further include a multiplexing unit coupled between the amplifying unit and the analog-digital conversion unit.

In another embodiment of the present invention, a touch sensing method is provided. The method includes dividing electrodes of a touch screen panel into one or more groups each including a plurality of the electrodes, respectively providing codes separable from one another as input sensing signals to the plurality of the electrodes included in each of the groups, adding output sensing signals received from the plurality of the electrodes for each of the groups after the respectively providing of the codes, separating the added sensing signals for each of the groups into the output sensing signals through demodulation using the codes, and detecting a touch input applied to the touch screen panel using the separated sensing signals.

The respectively providing of the codes may include respectively supplying, to the plurality of the electrodes included in each of the groups, code voltages corresponding to the codes.

The adding of the output sensing signals may include respectively coupling the plurality of the electrodes included in each of the groups to code voltage sources having code voltages corresponding to the codes, and coupling the plurality of the electrodes included in each of the groups to an output line after the code voltages are supplied to the respective electrodes.

The touch sensing method may further include amplifying the added sensing signals for each of the groups, and converting the amplified sensing signals into digital signals.

BRIEF DESCRIPTION OF THE DRAWINGS

Example embodiments of the present invention will now be described more fully hereinafter with reference to the accompanying drawings; however, the invention may be embodied in different forms and should not be construed as limited to the embodiments set forth herein. Rather, these embodiments are provided to more fully convey the scope of the present invention to those skilled in the art.

In the drawings, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
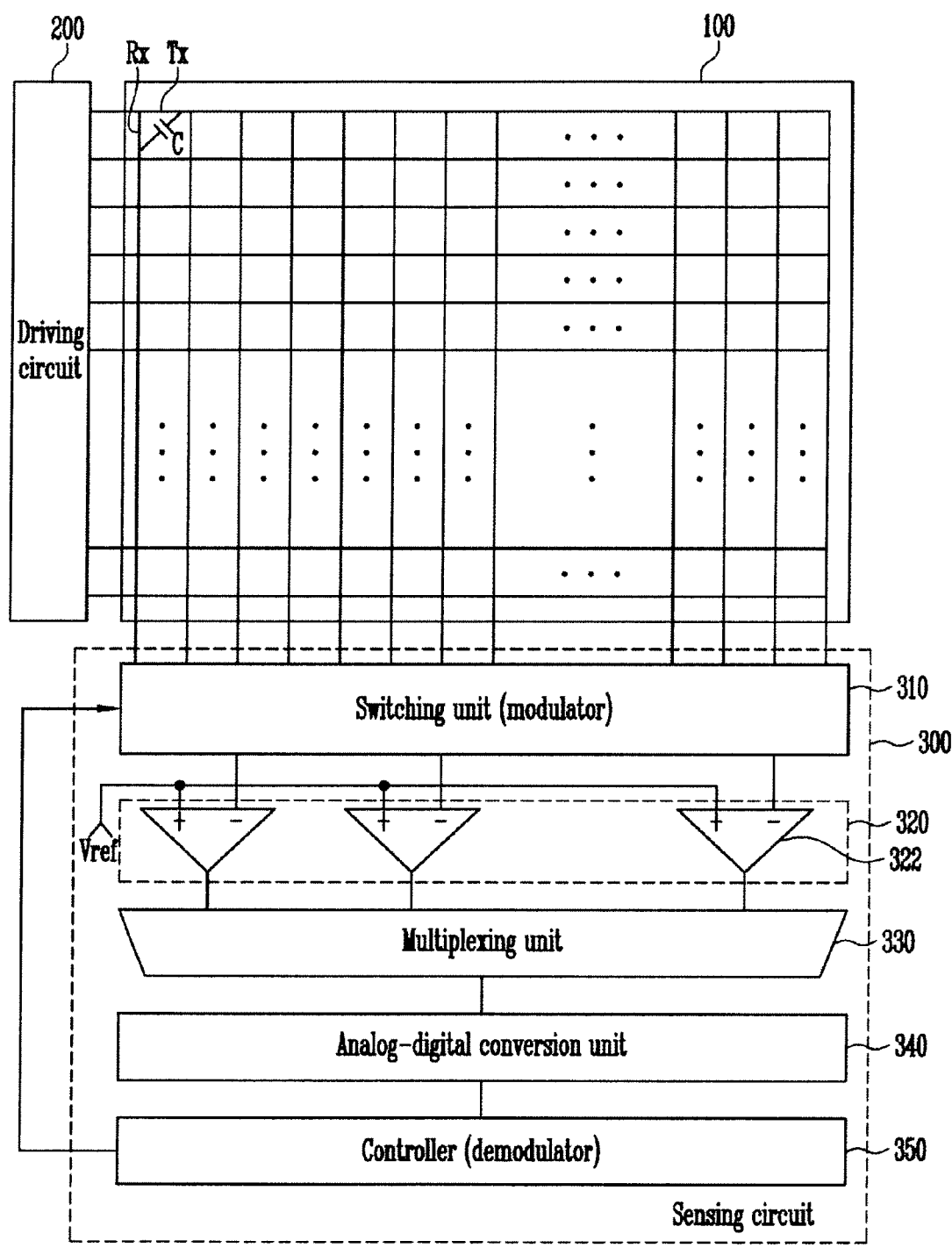
FIG. 1 is a block diagram illustrating a touch sensing apparatus according to an embodiment of the present invention.

Hereinafter, certain example embodiments according to the present invention will be described with reference to the accompanying drawings. Here, when a first element is described as being coupled to a second element, the first element may be directly coupled (e.g., connected) to the second element or indirectly coupled (e.g., electrically connected) to the second element via a third element. Further, some of the elements that are not essential to a complete understanding of an embodiment may be omitted for clarity. In addition, like reference numerals refer to like elements throughout. Herein, the use of the term "may," when describing embodiments of the present invention, refers to "one or more embodiments of the present invention." In addition, the use of alternative language, such as "or," when describing embodiments of the present invention, refers to "one or more embodiments of the present invention" for each corresponding item listed.

FIG. 1 is a block diagram illustrating a touch sensing apparatus according to an embodiment of the present invention.

Referring to FIG. 1, the touch sensing apparatus includes a touch screen panel 100 including a plurality of first electrodes Tx and a plurality of second electrodes Rx, a driving circuit 200 configured to supply a driving signal to the first electrodes Tx, and a sensing circuit 300 configured to detect output sensing signals from the second electrodes Rx and recognize a touch input corresponding to the detected output sensing signals.

The touch screen panel 100 includes the plurality of first electrodes Tx arranged along a first direction and the plurality of second electrodes Rx arranged along a second direction different from the first direction (e.g., crossing the first direction). For example, the first electrodes Tx may be driving electrodes and the second electrodes Rx may be sensing electrodes. The first and second electrodes Tx and Rx are arranged to cross each other while being spaced apart from each other, such that each pair of a first electrode Tx and a second electrode Rx forms a capacitance C.

The driving circuit 200 sequentially supplies a driving signal to the first electrodes Tx, corresponding to a control signal supplied from the outside of the touch sensing apparatus. The driving signal may be, for example, a square wave that swings between first and second voltages.

The sensing circuit 300 detects output sensing signals from the second electrodes Rx during a touch sensing period in which the first touch electrodes Tx are driven by the driving circuit 200, and recognizes a touch input based on the detected sensing signals. To this end, the sensing circuit 300 includes an amplifying unit 320 configured to amplify a combination or modulation of output sensing signals from the switching unit 310, an analog-digital conversion unit 340 configured to convert the amplified sensing signal from the amplifying unit 320 into a digital sensing signal, and a controller 350 configured to detect a touch input and its position using the digital sensing signal from the analog-digital conversion unit 340.

The sensing circuit 300 may further include a multiplexing unit 330 coupled between the amplifying unit 320 and the analog-digital conversion unit 340. If the multiplexing unit 330 is provided, it is possible to decrease the number of channels in the analog-digital conversion unit 340 and to improve the speed of the analog-digital conversion unit 340.

The sensing circuit 300 recognizes a touch input by adding (or combining or modulating) output sensing signals from groups of second electrodes Rx, amplifying and digitizing these sensed signal sums (or combinations or modulations), and then separating the sensed signal sums (or combinations or modulations) into the output sensing signals for each second electrode Rx. To this end, the touch sensing apparatus further includes a switching unit 310 disposed between the touch screen panel 100 and the amplifying unit 320 to modulate the output sensing signals by providing a code (for example, a predetermined code) as an input sensing signal to each second electrode Rx.

Figure 2:
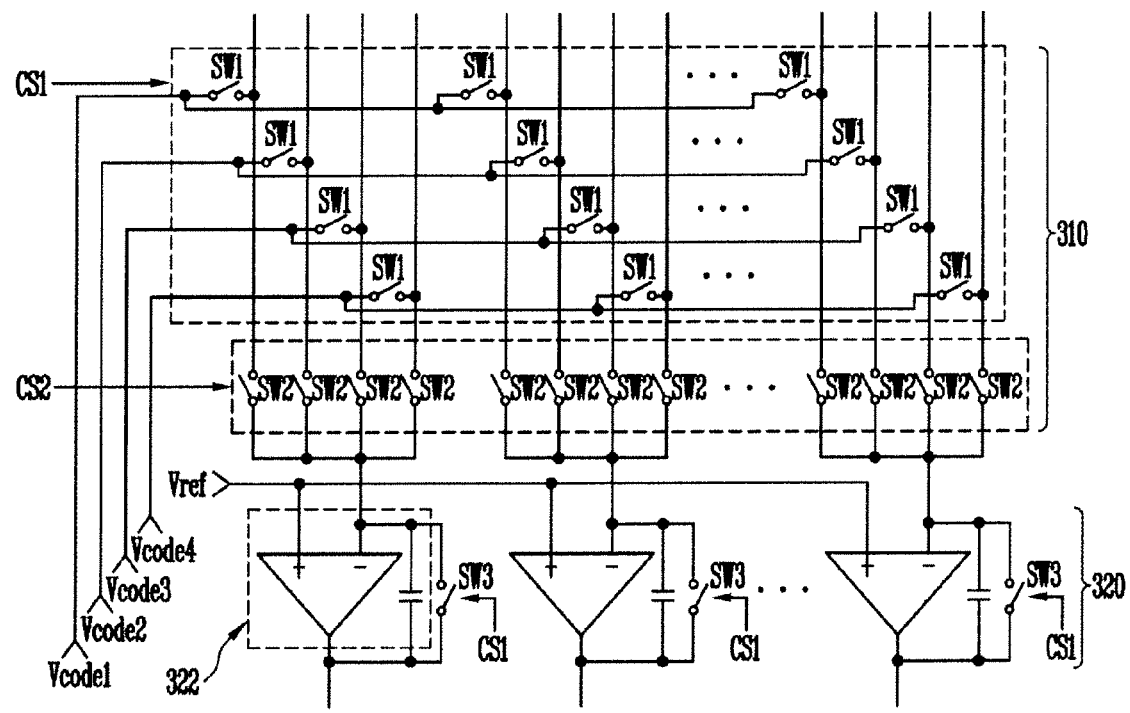
FIG. 2 is a circuit diagram illustrating an example configuration of a switching unit and an amplifying unit shown in FIG. 1.

The switching unit 310 includes a plurality of switches (see, for example, first switches SW1 and second switches SW2 in FIG. 2) configured to control the coupling between the second electrodes Rx and respective code voltage sources (supplying, for example, first to fourth code voltages Vcode1 to Vcode4 as shown in FIG. 2), and control the coupling between the second electrodes Rx and the amplifying unit 320. That is, a code is provided as the input sensing signal to each second electrode Rx using a switching method and thus, the switching unit 310 serves as a modulator. In one embodiment, the switching unit 310 modulates output sensing signals from the second electrodes Rx using orthogonal codes in which the convolution output between the output sensing signals becomes zero.

For example, the switching unit 310 may modulate the output sensing signals by dividing the second electrodes Rx into one or more groups each including $2^n$ (n is a natural number) second electrodes Rx and respectively providing $2^n \times 2^n$-bit separable orthogonal codes, e.g., Walsh codes (that is, $2^n$ orthogonal codes each of length $2^n$ bits) as input sensing signals supplied to the second electrodes Rx included in each group. The configuration and operation of the switching unit 310 will be described in more detail later.

The output sensing signals modulated by the switching unit 310 are added for each group (for example, each predetermined group) of second electrodes Rx and supplied to the amplifying unit 320. Thus, the switching unit 310 modulates the output sensing signals by dividing the second electrodes Rx into one or more groups each including two or more second electrodes Rx and respectively providing separable orthogonal codes as the input sensing signals supplied to the second electrodes Rx included in each group. Subsequently, the switching unit 310 concurrently (for example, simultaneously) supplies the modulated sensing signals included in the same group to an amplifier 322 provided in the amplifying unit 320.

Then, the amplifying unit 320 amplifies the modulated sensing signals that have been added for each group. To this end, the amplifying unit 320 may include one or more amplifiers 322 assigned to the respective one or more groups. For example, the amplifier 322 may be driven using a reference voltage Vref from the outside as an input voltage, in addition to the sensing signals modulated from the switching unit 310.

Thus, the output sensing signals added for each group are amplified so that the number of required amplifiers 322 is decreased (e.g., significantly decreased) compared to when the output sensing signals from the second electrodes Rx are individually amplified. For example, when the amplification is performed after modulation in which different orthogonal codes are respectively provided as the input sensing signals supplied to four second electrodes Rx, the number of the amplifiers 322 can be decreased by ¾.

The modulated sensing signals are supplied to the analog-digital conversion unit 340 via the amplifying unit 320 after the output sensing signals are added for each group. Thus, the analog-digital conversion unit 340 converts the modulated sensing signals amplified by the amplifying unit 320 into digital signals. Because the amplified sensing signals are added for each group, the number of channels in the analog-digital conversion unit 340 can also be decreased, for example, by ¾.

Accordingly, it is possible to simplify the configuration of the sensing circuit and to reduce power consumption.

The modulated sensing signals digitized by the analog-digital conversion unit 340 are demodulated by the controller 350 and used in recognizing a touch input. To this end, the controller 350 may include a demodulator.

The controller 350 demodulates the modulated sensing signals digitized by the analog-digital conversion unit 340 using the codes used in the switching unit 310 so that the added sensing signals for each group are separated into the output sensing signals received from the respective second electrodes Rx. Thus, the controller 350 separates the output sensing signals and detects the touch input by demodulating the modulated sensing signals added for each group using the separable codes provided as the respective input sensing signals to the second electrodes Rx.

Subsequently, the controller 350 recognizes a touch input using the output sensing signals separated by the demodulation. For example, the controller 350 may evaluate capacitance ratios corresponding to the respective second electrodes Rx from the separated output sensing signals (such as output voltages). Accordingly, the controller 350 can detect a touch input and its position. In addition, the controller 350 may control the switching unit 310 by supplying a control signal, e.g., a switching signal, clock signal, etc.

As such, the sensing circuit 300 amplifies and digitizes modulated sensing signals for each group of second electrodes Rx using modulation/demodulation of the output sensing signals. Accordingly, the number of amplifiers 322 provided in the amplifying unit 320 and the number of channels of the analog-digital conversion unit 340 can be decreased (e.g., significantly decreased) so that it is possible to simplify the configuration of the sensing circuit 300 and to improve power consumption.

Further, noise mixed with output sensing signals can be reduced or removed through the modulation and demodulation process. For example, when the output sensing signals are modulated using $2^n$-bit orthogonal codes (e.g., $2^n$ such codes), capacitances are measured for each second electrode Rx during $2^n$ separate clock timings (e.g., one for each of the $2^n$ bits of each of the $2^n$ codes) and thus, it is possible to effectively reduce noise. Accordingly, it is possible to stabilize the operation of the sensing circuit 300 and to improve the reliability of the sensing circuit 300.

As described above, it is possible to provide a touch sensing apparatus having reduced noise and improved power consumption.

Figure 3:
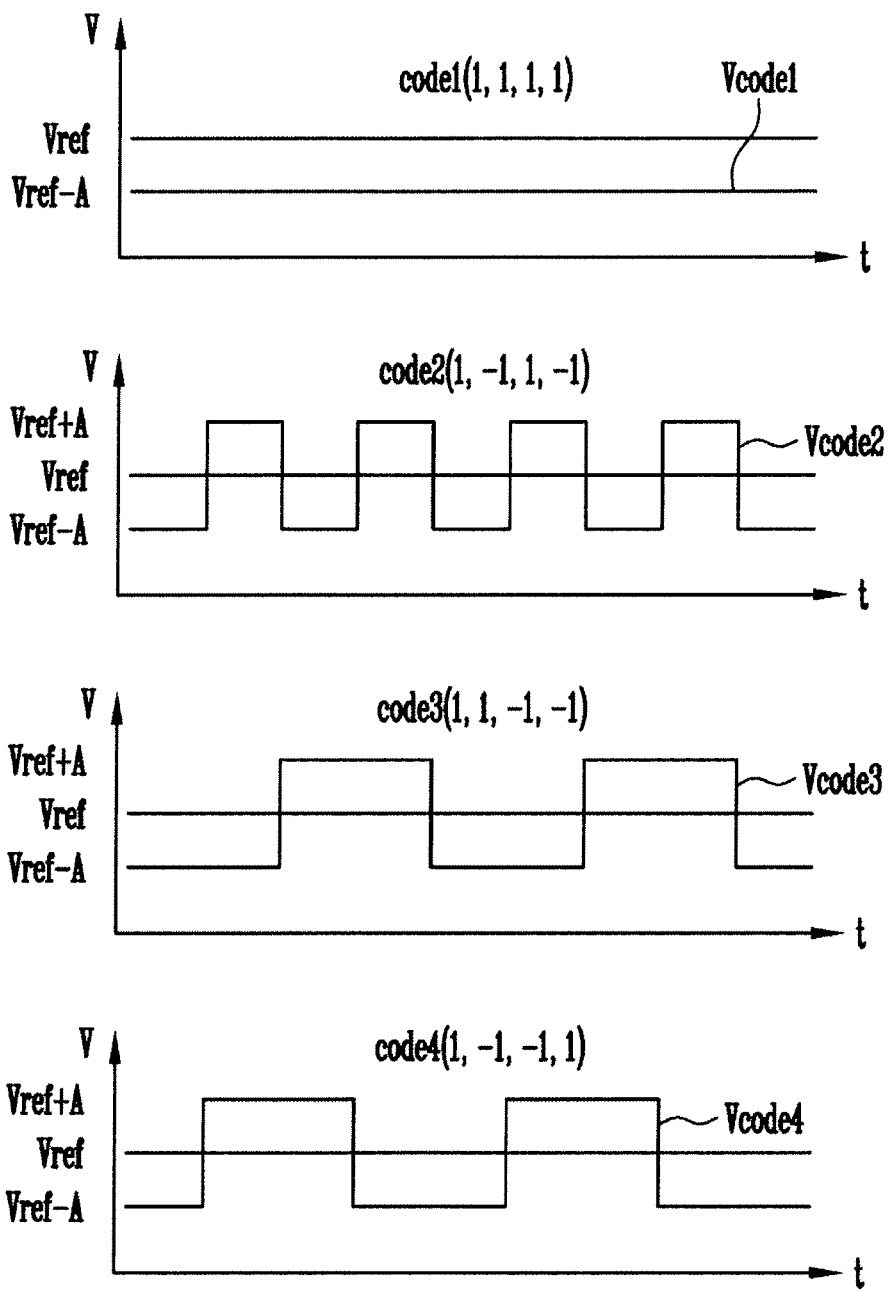
FIG. 3 is a waveform diagram illustrating examples of first to fourth code voltages of FIG. 2.
Figure 4:
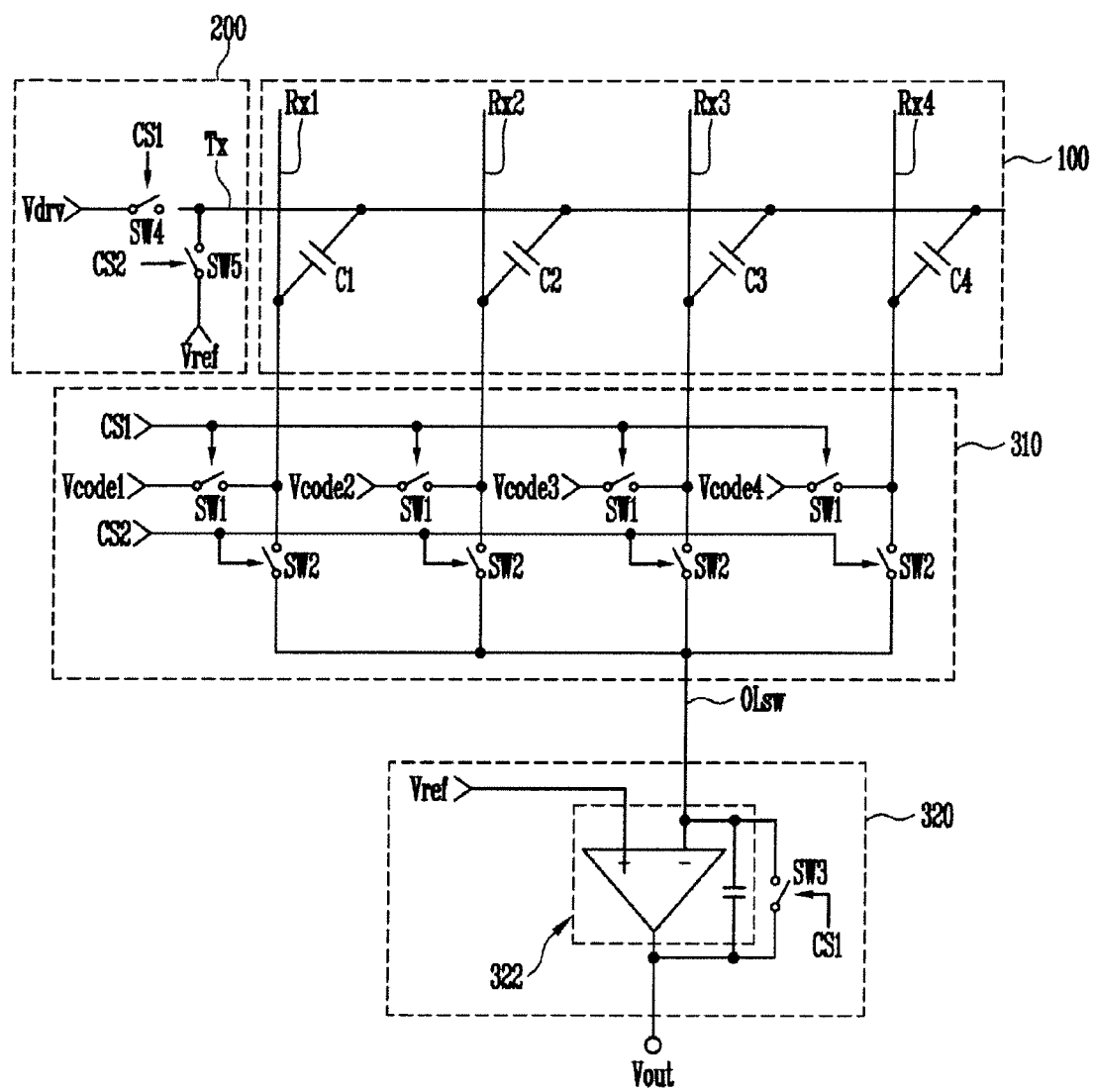
FIG. 4 is a circuit diagram illustrating a driving principle of a touch sensing apparatus according to an embodiment of the present invention.

FIG. 2 is a circuit diagram illustrating an example configuration of the switching unit 310 and the amplifying unit 320 shown in FIG. 1. FIG. 3 is a waveform diagram illustrating examples of the first to fourth code voltages Vcode1 to Vcode4 of FIG. 2. For convenience, an example in which the output sensing signals are modulated using four 4-bit orthogonal codes is shown in FIGS. 2 and 3. Thus, the output sensing signals from four second electrodes Rx (such as second electrodes Rx1 to Rx4 as shown in FIG. 4) constituting one group are respectively modulated by four different orthogonal codes and then added for each group and amplified after each bit (e.g., four separate times). However, the present invention is not limited thereto, and it will be apparent that the number of orthogonal codes, the number of bits of each orthogonal code, and the number of second electrodes Rx included in one group may be variously modified and embodied.

First, referring to FIG. 2, the switching unit 310 includes a plurality of first switches SW1 coupled between the respective second electrodes Rx and code voltage sources (such as those supplying first to fourth code voltages Vcode1 to Vcode4), and a plurality of second switches SW2 coupled between the respective second electrodes Rx and the amplifying unit 320.

Here, the code voltage sources are voltage sources configured to supply code voltages Vcode (e.g., first to fourth code voltages Vcode1 to Vcode4) corresponding to respective orthogonal codes. For example, when four orthogonal codes each having 4 bits are used, the code voltage sources may be voltage sources configured to respectively supply a first code voltage Vcode1, a second cove voltage Vcode2, a third code voltage Vcode3, and a fourth code voltage Vcode4. The second electrodes Rx may be classified into groups each including four second electrodes Rx, and the second electrodes Rx included in the same group may receive different code voltages Vcode1, Vcode2, Vcode3, and Vcode4 via the first switches SW1 (e.g., each group contains four second electrodes Rx each receiving a different one of the first to fourth code voltages Vcode1 to Vcode4).

For example, the second electrodes Rx arranged in a (4k−3)-th (k is a natural number) column may be coupled to a code voltage source configured to supply the first code voltage Vcode1 via the first switches SW1, and the second electrodes Rx arranged in a (4k−2)-th column may be coupled to a code voltage source configured to supply the second code voltage Vcode2 via the first switches SW1. The second electrodes Rx arranged in a (4k−1)-th column may be coupled to a code voltage source configured to supply the third code voltage Vcode3 via the first switches SW1, and the second electrodes Rx arranged in a 4k-th column may be coupled to a code voltage source configured to supply the fourth code voltage Vcode4 via the first switches SW1.

The first to fourth code voltages Vcode1, Vcode2, Vcode3, and Vcode4 may be separable orthogonal codes (e.g., 4-bit Walsh codes). As an example, the first to fourth code voltages Vcode1, Vcode2, Vcode3, and Vcode4 may be code voltages respectively corresponding to four codes of (1, 1, 1, 1), (1, −1, 1, −1), (1, 1, −1, −1), and (1, −1, −1, 1).

For example, the first to fourth code voltages Vcode1, Vcode2, Vcode3, and Vcode4 may be as shown in FIG. 3.

Referring to FIG. 3, the voltage corresponding to +1 of each code may be the reference voltage Vref decreased by a voltage A, and the voltage corresponding to −1 of each code may be the reference voltage Vref increased by the voltage A. This is set in consideration that the voltage charged in the capacitance C generated between the first and second electrodes Tx and Rx is a voltage corresponding to the difference voltage between voltages respectively applied to the first and second electrodes Tx and Rx.

Referring back to FIG. 2, the first switches SW1 coupling code voltages Vcode to the respective second electrodes Rx may be concurrently (for example, simultaneously) turned on during a driving period by a first control signal CS1 supplied from the controller 350, etc., and the second switches SW2 coupling the respective second electrodes Rx to the amplifying unit 320 may be concurrently (for example, simultaneously) turned on during a sensing period by a second control signal CS2 supplied from the controller 350, etc. For example, the first and second switches SW1 and SW2 may be alternately turned on.

Thus, the switching unit 310 modulates the output sensing signals by supplying code voltages Vcode as input sensing signals to the respective second electrodes Rx through the first switches SW1, and then adds the modulated sensing signals for each group and inputs the added signals to the respective amplifiers 322 by coupling the respective second electrodes Rx to the amplifying unit 320 through the second switches SW2. Thus, the switching unit 310 adds output sensing signals for each group of second electrodes Rx to which separable codes are provided and supplies the added sensing signals to the amplifying unit 320.

The amplifying unit 320 has one or more amplifiers 322 configured to amplify the modulated sensing signals supplied from the switching unit 310 after the output sensing signals are added for each group. For example, the amplifying unit 320 may have a number of amplifiers corresponding to the number of groups of second electrodes Rx from which output sensing signals are added.

However, the present invention is not necessarily limited to the above configuration. In other embodiments, the amplifying unit 320 may include one or more amplifiers 322 that concurrently (for example, simultaneously) receive sensing signals modulated to be separable from one another.

All the sensing electrodes Rx may be implemented as one group by increasing the number of bits of each code used when the sensing signals are modulated. In this case, one amplifier 322 may be used.

Thus, the number of sensing electrodes Rx included in one group or the number of amplifiers 322 concurrently (for example, simultaneously) receiving sensing signals modulated from the sensing electrodes Rx included in the same group may be variously modified and embodied.

Meanwhile, the amplifying unit 320 further includes third switches SW3 coupled in parallel to the respective amplifiers 322. For example, when the amplifying unit 320 has one or more amplifiers 322, the amplifying unit 320 may have one or more third switches SW3, the number of third switches SW3 corresponding to the number of amplifiers 322.

The third switches SW3 may be turned on by the first control signal CS1. Thus, the third switches SW3 may be turned on when the codes are respectively provided as the input sensing signals to the second electrodes Rx so that the amplifiers are operated as buffers. The third switches SW3 are turned off when the modulated sensing signals are supplied to the amplifying unit 320 so that the amplifiers 322 can amplify the modulated sensing signals.

The switching unit 310 and the amplifying unit 320 having the above configuration will be described in more detail below with reference to FIGS. 4 and 5.

FIG. 4 is a circuit diagram illustrating a driving principle of a touch sensing apparatus (including touch screen panel 100) according to an embodiment of the present invention. FIG. 5 is a waveform diagram illustrating an example of switching timing for driving the touch sensing apparatus of FIG. 4. For convenience, an example in which four second electrodes Rx1, Rx2, Rx3, and Rx4 respectively receiving code voltages Vcode1, Vcode2, Vcode 3, and Vcode4 corresponding to different 4-bit orthogonal codes constituting one group is shown in FIG. 4. In addition, only the four second electrodes Rx1, Rx2, Rx3, and Rx4 included in the one group and one first electrode Tx are shown in FIG. 4.

Figure 5:
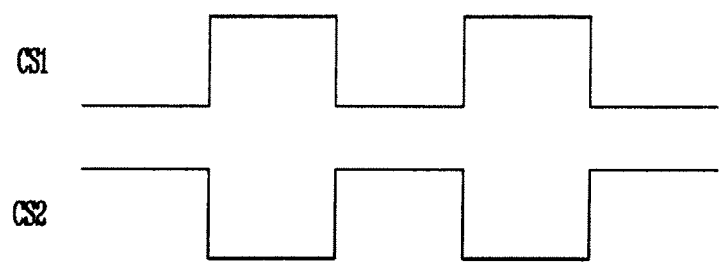
FIG. 5 is a waveform diagram illustrating an example of switching timing for driving the touch sensing apparatus of FIG. 4.

Referring to FIGS. 4 and 5, the driving circuit 200 supplies, to the first electrode Tx, a square wave-shaped driving signal which swings between first and second voltages Vdry and Vref, where the first and second voltages Vdry and Vref are different voltages and, in this embodiment, the second voltage Vref is the same voltage as the reference voltage Vref described above. To this end, the driving circuit 200 may include a fourth switch SW4 coupled between the first electrode Tx and a voltage source configured to supply the first voltage Vdrv, and a fifth switch SW5 coupled between the first electrode Tx and a voltage source configured to supply the second voltage Vref and alternately turned on with the fourth switch SW4. For example, the fourth switch SW4 may be turned on by a first control signal CS1 and the fifth switch SW5 may be turned on by a second control signal CS2 having a waveform opposite to that of the first control signal CS1.

Meanwhile, although not shown in FIG. 4 for convenience, the fourth and fifth switches SW4 and SW5 may be provided to each first electrode Tx so that a plurality of first electrodes Tx are sequentially driven. In another embodiment, the plurality of first electrodes Tx may share the fourth and fifth switches SW4 and SW5 with one another so that the first electrodes Tx are sequentially driven by providing a multiplexing unit between the first electrodes Tx and a coupling node between the fourth and fifth switches SW4 and SW5. Thus, the configuration of the driving circuit 200 may be variously modified and embodied.

When the first voltage Vdry is applied to the first electrode Tx (e.g., during a driving period), the switching unit 310 supplies, to each second electrode Rx, a code voltage Vcode corresponding to a code (such as from a set of orthogonal codes as described above). When the second voltage Vref is applied to the first electrode Tx (e.g., during a sensing period), the switching unit 310 couples the second electrodes Rx to the amplifying unit 320.

To this end, the first switches SW1 may be concurrently (for example, simultaneously) turned on with the fourth switch SW4 by the first control signal CS1, and the second switches SW2 may be concurrently (for example, simultaneously) turned on with the fifth switch SW5 by the second control signal CS2.

When the first voltage Vdry and the code voltage Vcode are respectively applied to the first electrode Tx and the second electrodes Rx (such as during the driving period), the amplifier 322 serves as a buffer. When the second electrodes Rx are coupled to the amplifying unit 320 (such as during the sensing period), the amplifier 322 amplifies sensing signals to which codes are respectively provided. To this end, the third switch SW3 coupled in parallel to each amplifier 322 may be concurrently (for example, simultaneously) turned on with the first and fourth switches SW1 and SW4 by the first control signal CS1.

A driving method of the touch sensing apparatus having the above configuration will be described in more detail. First, the first, third, and fourth switches SW1, SW3, and SW4 are turned on during a driving period in which the first control signal CS1 is supplied.

When the fourth switch SW4 is turned on, the first voltage Vdry is applied to the first electrode Tx. When the first switches SW1 are turned on, code voltages Vcode are applied to the respective second electrodes Rx as input sensing signals. For example, a first code voltage Vcode1, a second code voltage Vcode2, a third code voltage Vcode3, and a fourth code voltage Vcode4 may be respectively applied to a (first) second electrode Rx1 on a first column, a (second) second electrode Rx2 on a second column, a (third) second electrode Rx3 on a third column, and a (fourth) second electrode Rx4 on a fourth column.

Capacitances C are formed between the first electrode Tx and the respective second electrodes Rx. If the capacitances C are equivalently represented as first to fourth capacitors C1 to C4, the first voltage Vdry and the code voltages Vcode are applied to both ends of the respective first to fourth capacitors C1 to C4. Thus, voltages corresponding to voltage differences between the first voltage Vdry and the code voltages Vcode are charged in the respective first to fourth capacitors C1 to C4.

Thus, a voltage corresponding to the voltage difference between the first voltage Vdry and the first code voltage Vcode1 is charged in the first capacitor C1, and a voltage corresponding to the voltage difference between the first voltage Vdry and the second code voltage Vcode2 is charged in the second capacitor C2. In addition, a voltage corresponding to the voltage difference between the first voltage Vdry and the third code voltage Vcode3 is charged in the third capacitor C3, and a voltage corresponding to the voltage difference between the first voltage Vdry and the fourth code voltage Vcode4 is charged in the fourth capacitor C4.

Thus, during the driving period in which the first control signal CS1 is supplied, code voltages, i.e., voltages corresponding to the first to fourth code voltages Vcode1 to Vcode4, are charged in the first to fourth capacitors C1 to C4, respectively.

Meanwhile, during a sensing period in which the second control signal CS2 is supplied, the first, third and fourth switches SW1, SW3, and SW4 are turned off, and the second and fifth switches SW2 and SW5 are turned on. When the fifth switch SW5 is turned on, the second voltage Vref is applied to the first electrode Tx.

When the second switch SW2 is turned on, the second electrodes Rx are coupled to the amplifier 322 and accordingly, the sensing signals are modulated so that voltages, e.g., predetermined codes, respectively provided thereto are concurrently (for example, simultaneously) input to the amplifier 322. Thus, the modulated sensing signals are added for each group on an output line OLsw and then input to the amplifier 322.

In addition, the third switch SW3 is turned off and hence, the amplifier 322 amplifies and outputs the added sensing signals for each group. The amplified sensing signal Vout for each group is supplied to the controller 350 via, for example, the multiplexing unit 330 and/or the analog-digital conversion unit 340 shown in FIG. 1.

Then, the controller 350 separates the added sensing signals for each group through the modulation into the output sensing signals of each second electrode Rx, and recognizes a touch input based on the separated sensing signals.

The touch sensing apparatus described with reference to FIGS. 1 to 5 amplifies and digitizes modulated sensing signals for each group of second electrodes Rx using modulation/demodulation of the output sensing signals. Accordingly, it is possible to provide a touch sensing apparatus having reduced noise and improved power consumption.

A touch sensing method using the touch sensing apparatus described above will be schematically summarized. The touch sensing method includes: dividing electrodes (e.g., second electrodes Rx) of a touch screen panel (e.g., touch screen panel 100), which is configured to receive touch inputs and output corresponding output sensing signals, into one or more groups of second electrodes Rx; adding the output sensing signals from the second electrodes Rx after codes (e.g., orthogonal codes) separable from one another are provided as input sensing signals to the respective second electrodes Rx included in each group; amplifying and digitizing the added sensing signals for each group; separating the amplified and digitized sensing signals into the output sensing signals of each second electrode Rx through demodulation using the codes; and detecting a touch input applied to the touch screen panel using the separated sensing signals.

Here, in order to provide a code to each output sensing signal, code voltages Vcode corresponding to the codes may be applied as input sensing signals to the respective second electrodes Rx.

The adding of the output sensing signals output by the second electrodes Rx after the codes (such as orthogonal codes) separable from one another are provided as input sensing signals to the respective second electrodes Rx included in each group may include: respectively coupling the second electrodes Rx included in the group to code voltage sources having code voltages corresponding to the codes; and coupling the second electrodes Rx included in each group to an output line OLsw after the code voltages Vcode are applied as the input sensing signals to the respective second electrodes Rx.

Accordingly, the output sensing signals added for each group may be amplified for each group by the amplifying unit 320. Subsequently, the amplified sensing signals are converted into digital signals by the analog-digital conversion unit 340 and then input to the controller 350.

Then, the modulated (e.g., combined, such as added) sensing signals converted into the digital signals for each group are demodulated by the controller 350 and separated into the output sensing signals corresponding to the respective second electrodes Rx. The separated sensing signals are used to detect a touch input applied to the touch screen panel 100, its position, etc.

By way of summation and review, a capacitive touch sensing apparatus includes a touch screen panel (such as touch screen panel 100) including a plurality of electrodes (such as second electrodes Rx) forming capacitances with driving electrodes (such as first electrode Tx) and provided on a front face of a display panel (that includes the touch screen panel 100), a driving circuit (such as driving circuit 200) configured to supply a driving signal to the touch screen panel, and a sensing circuit (such as sensing circuit 300) configured to sense a touch input applied to the touch screen panel when the driving circuit is supplied from the driving circuit.

The capacitive touch sensing apparatus senses a touch input by supplying a square wave-shaped driving signal to the touch screen panel and detecting a change in capacitance formed between the electrodes of the touch screen panel when the driving signal is supplied from the driving circuit. However, when considering a use environment that may be easily exposed to various kinds of signals, it is highly likely that noise may be mixed with output sensing signals from the touch screen panel in the process of sensing a touch input using the capacitive touch sensing apparatus. The noise becomes a main factor that lowers the operational stability of the touch sensing apparatus.

The output sensing signals from the touch screen panel are signal-processed via an amplifier, an analog-digital converter, etc., and then used in detecting a touch input and its position. To this end, the sensing circuit includes one or more amplifiers (such as amplifiers 322) respectively coupled to one or more groups of sensing electrodes of the touch screen panel, and an analog-digital converter (such as analog-digital conversion unit 340) including, for example, a plurality of channels or a multiplexing unit (such as multiplexing unit 330) for converting analog signals from the amplifiers into digital signals. Accordingly, power consumption is improved.

In the touch sensing apparatus and the touch sensing method using the touch sensing method, a plurality of sensing signals are modulated (for example, combined, such as added) to be separable from one another and then amplified and digitized. The added signals are separated into output sensing signals by demodulating the digitized sensing signals, and the separated sensing signals are used to detect a touch input. Accordingly, it is possible to reduce noise of the touch sensing apparatus and to improve power consumption.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims and their equivalents.

What is claimed is:

1. A touch sensing apparatus comprising:
a touch screen panel comprising driving electrodes along a first direction and sensing electrodes along a second direction crossing the first direction to form capacitances with the driving electrodes;
a driving circuit configured to supply a driving signal to the driving electrodes; and
a sensing circuit configured to detect output sensing signals from the sensing electrodes and recognize a touch input based on the output sensing signals,
wherein the sensing circuit comprises:
a switching unit configured to modulate the output sensing signals from the sensing electrodes by providing codes as respective input sensing signals to the sensing electrodes;
an amplifying unit configured to amplify the modulated sensing signals;
an analog-digital conversion unit configured to convert the amplified sensing signals into digital sensing signals; and
a controller configured to demodulate the digital sensing signals and detect a touch input and its position from the demodulated sensing signals,
wherein the switching unit comprises:
first switches respectively coupled between the sensing electrodes and code voltage sources; and
second switches respectively coupled between the sensing electrodes and the amplifying unit,
wherein the amplifying unit comprises:
a number of amplifiers corresponding to a number of groups each comprising ones of the sensing electrodes from which corresponding said output sensing signals are added; and
third switches coupled in parallel with respective said amplifiers, and
wherein the first switches and the third switches are configured to turn on concurrently.

2. The touch sensing apparatus of claim 1, wherein the switching unit is further configured to
divide the sensing electrodes into one or more groups each comprising two or more of the sensing electrodes,
modulate the output sensing signals by respectively providing orthogonal codes as the input sensing signals to the sensing electrodes included in each of the groups, and then
concurrently supply the modulated sensing signals included in a same one of the groups to an amplifier provided in the amplifying unit.

3. The touch sensing apparatus of claim 2, wherein the controller is further configured to separate the output sensing signals and detect the touch input by demodulating the modulated sensing signals for each group using the orthogonal codes provided as the respective input sensing signals.

4. The touch sensing apparatus of claim 2, wherein the amplifying unit comprises a corresponding one or more amplifiers respectively assigned to the groups.

5. The touch sensing apparatus of claim 1, wherein the switching unit is further configured to
divide the sensing electrodes into one or more groups each comprising $2^n$ (n is a natural number) of the sensing electrodes, and
respectively provide $2^n$ $2^n$-bit separable orthogonal codes as the input sensing signals to the sensing electrodes included in one group.

6. The touch sensing apparatus of claim 1,
wherein the first switches and the second switches are configured to alternately turn on, and
wherein the switching unit is further configured to
supply code voltages as the respective input sensing signals to the respective sensing electrodes using the first switches, and then
couple the respective sensing electrodes to the amplifying unit using the second switches.

7. The touch sensing apparatus of claim 1,
wherein the driving circuit is further configured to supply, to the driving electrodes, a driving signal that swings between first and second voltages, and
wherein the switching unit is further configured to supply, to the respective sensing electrodes, code voltages corresponding to the codes when the first voltage is supplied to the driving electrodes, and couple the sensing electrodes to the amplifying unit when the second voltage is supplied to the driving electrodes.

8. The touch sensing apparatus of claim 1, wherein the switching unit is further configured to add the output sensing signals from ones of the sensing electrodes to which separable ones of the codes are respectively provided, and supply the added sensing signals to the amplifying unit.

9. The touch sensing apparatus of claim 8, wherein the third switches are configured to turn on when the codes are provided as the respective input sensing signals, and to turn off when the modulated sensing signals are supplied to the amplifying unit.

10. The touch sensing apparatus of claim 1, further comprising a multiplexing unit coupled between the amplifying unit and the analog-digital conversion unit.

11. A touch sensing method comprising:

dividing electrodes of a touch screen panel into one or more groups each comprising a plurality of the electrodes;

modulating sensing signals from sensing electrodes of the electrodes by respectively providing codes separable from one another as input sensing signals to the plurality of the electrodes included in each of the groups;

adding output sensing signals received from the plurality of the electrodes for each of the groups after the respectively providing of the codes;

separating the added sensing signals for each of the groups into the output sensing signals through demodulation using the codes; and detecting a touch input applied to the touch screen panel using the separated sensing signals.

12. The touch sensing method of claim 11, wherein the respectively providing of the codes comprises respectively supplying, to the plurality of the electrodes included in each of the groups, code voltages corresponding to the codes.

13. The touch sensing method of claim 11, wherein the adding of the output sensing signals comprises:

respectively coupling the plurality of the electrodes included in each of the groups to code voltage sources having code voltages corresponding to the codes; and coupling the plurality of the electrodes included in each of the groups to an output line after the code voltages are supplied to the respective electrodes.

14. The touch sensing method of claim 11, further comprising:

amplifying the added sensing signals for each of the groups; and converting the amplified sensing signals into digital signals.

* * * * *